United States Patent [19]
Tebbs

[11] Patent Number: 5,218,547
[45] Date of Patent: Jun. 8, 1993

[54] UNIVERSAL MEMORY LOADER VERIFIER

[76] Inventor: Mark C. Tebbs, 284 E. 1250 N., Bountiful, Utah 84010

[21] Appl. No.: 702,561

[22] Filed: May 20, 1991

[51] Int. Cl.$^5$ .............................................. G06F 13/00
[52] U.S. Cl. .............................................. 364/424.06
[58] Field of Search ............... 364/708, 424.01–424.06

[56] References Cited
U.S. PATENT DOCUMENTS

| | | | |
|---|---|---|---|
| 4,481,574 | 11/1984 | DeFino et al. | 364/200 |
| 4,586,159 | 4/1986 | Thomas et al. | 364/900 |
| 4,713,781 | 12/1987 | Brizgis et al. | 364/552 |
| 4,858,162 | 8/1989 | Kieffer et al. | 364/708 |
| 4,899,306 | 2/1990 | Greer | 364/900 |

*Primary Examiner*—Emanuel S. Kemeny
*Attorney, Agent, or Firm*—Irwin P. Garfinkle; Donald J. Singer

[57] ABSTRACT

A Universal Memory Loader Verifier (UMLV) is disclosed. The loader comprises a system used to load and verify Operational Flight Programs (OFP) into an unlimited number of different types of avionics computers without the need for adding additional hardware (with the exception of an additional cable that may be unique to each particular computer being loaded and verified). The disclosed Universal Memory Loader Verifier (UMLV) consists of a portable, off the shelf, militarized, arm held, battery backed Personal Computer. The PC contains a custom interface card for different types of applications. The PC output is connected to a buffer box having a custom card therein by means of a cable. The buffer box is connected to a single ended driver/receiver type avionics computer through a unique cable. This connection requires an additional cable for each computer type. For all other applications, the PC is connected directly to the avionics computer by means of a unique cable. The Operational Flight Programs for every computer are loaded into the PC RAM memory from a detachable floppy drive, and is maintained in memory by means of a battery.

3 Claims, 2 Drawing Sheets

UNIVERSAL MEMORY LOADER VERIFIER

STATEMENT OF GOVERNMENT INTEREST

The invention described herein may be manufactured and used by or for the Government for governmental purposes without the payment of any royalty thereon.

The invention relates to avionics computers, and for providing a means of loading unlimited numbers of different types of avionics computers with their Operational Flight Program.

This invention is for a Universal Memory Loader Verifier (UMLV), a system that is used to load and verify Operational Flight Program (OFP) into an unlimited number of different types of avionics computers without the need for adding additional hardware with the exception of an additional cable that may be unique to the particular computer. The disclosed Universal Memory Loader Verifier (UMLV) consists of a portable, off the shelf, militarized, arm held Personal Computer, a custom interface card installed in the PC, a militarized buffer box connected to the PC via a cable, and a cable for each different type of avionics computer to be loaded. The purpose of the UMLV is to load and verify Operational Flight Programs into several different avionic computers.

BACKGROUND OF THE INVENTION

Avionics computers installed in various aircraft require periodic updates in their software (Operational Flight Program). These updates in software may involve the fixing of bugs or the enhancement of capabilities in existing software. In any case, any time the software for an avionics computer is changed it must be loaded into all avionics computers of the same type and mission.

To load software into an avionics computer, use has been made of a Memory Loader Verifier (MLV). The MLV is a large and heavy system requiring customizing for each type avionics computer. The MLV requires internal modification in hardware, different buffer boxes and different cables for each type of avionics computer. In addition, it had slow loading speeds and requires a very costly interface to load the software of the avionics computer into the MLV.

One prior art method was to use a different type of MLV for each type of computer. The drawback with this is the costs of supporting so many different MLVs and the slow speed of getting updated software into avionics computers.

The most flexible of the memory loader verifiers in use by the U.S. Air Force is the so-called 660 MLV. This equipment is a very large, heavy device that is custom, requires internal modifications in hardware for each type of avionics computer, separate buffer boxes for each type of avionics computer, has slow loading speeds and has a very expensive Raymond tape interface which is used to load the software of the avionics computer into the MLV.

Thus, there has been a need for a cost saving MLV that is portable, universal, expandable, off the shelf to the extent possible, and which has a capability of fast loading time for avionics computers. The present invention was designed to meet these needs and will replace most MLVs currently in use today.

THE PRIOR ART

A search of the prior art yielded several prior art patents U.S. Pat. No. 4,481,574 issued to DeFino discloses a hand held computer for communicating over telephone lines with a host computer. U.S. Pat. No. 4,586,159 issued to Thomas discloses a bus adaptor that interconnects incompatible digital systems which are asynchronous to each other. U.S. Pat. No. 4,713,781 issued to Brizgis teaches a portable PC including an interface card for providing digitized signals. U.S. Pat. No. 4,858,162 issued to Kieffer discloses a portable computer having means to mount expansion card. U.S. Pat. No. 4,899,306 shows a general purpose computer test interface which is capable of testing various types of computers having different input/output characteristics. No prior art uncovered by the search teaches the use of a portable PC for testing and loading a wide variety of avionics computers, comprising a universal system, requiring only a different cable connector for each type of avionics computer under test.

SUMMARY OF THE INVENTION

In accordance with this invention, a Universal Memory Loader Verifier (UMLV) was designed to replace the current Memory Loader Verifiers in use today. The UMLV loads and verifies Operation Flight Programs into many different aircraft computers without the need of adding additional hardware, with the exception of a custom cable for each type of avionics computer in use today. The UMLV is a militarized arm held device that is built for tempest requirements, weighs 14 pounds off the shelf plus a custom hardware card, buffer box, and custom cables. The system is IBM compatible, personal computer based, and is expandable.

BRIEF DESCRIPTION OF THE DRAWING

For a better understanding of the nature and the scope of the invention, reference should now to be made to the following detailed description and to the accompanying drawings in which.

Figure 1:
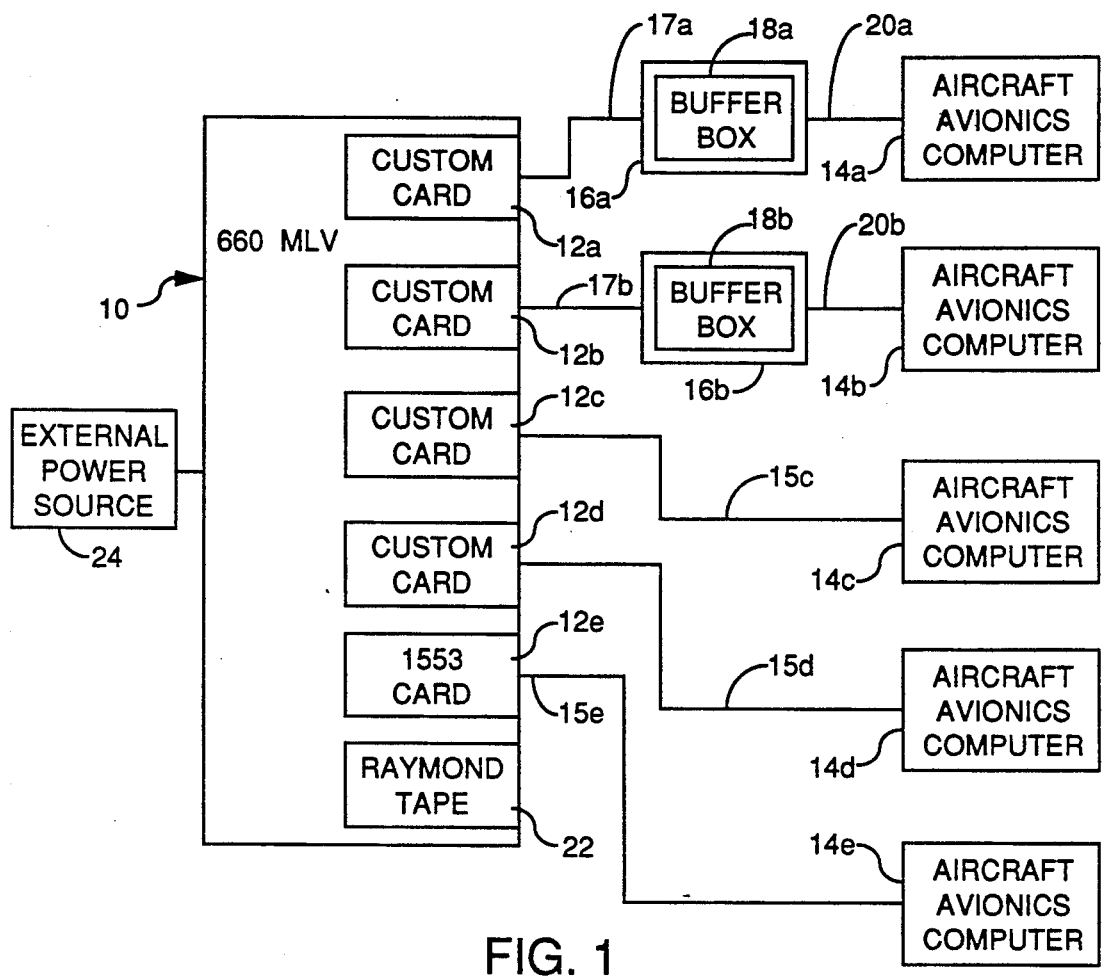
FIG. 1 is a block diagram of the prior so-called 660 MLV.
Figure 2:
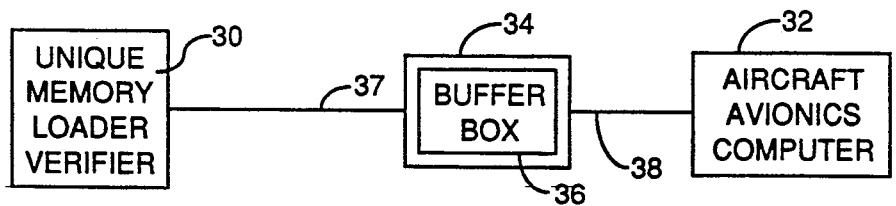
FIG. 2 is a block diagram of a prior art MLV that supports only a single ended driver/receiver type avionics computers.
Figure 3:
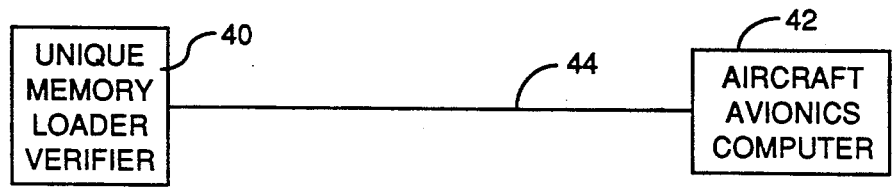
FIG. 3 is a block diagram of another prior art MLV that supports only differential driver/receiver type avionics computers.

DESCRIPTION OF FIGS. 1 to 3 (PRIOR ART)

Before proceeding with a description of the preferred embodiment, reference will first be made to the various prior art systems shown in FIGS. 1, 2 and 3.

The 660 Memory Loader Verifier (MLV) shown in FIG. 1 provides a means for loading operational flight program (OFPs) into a number of different types of avionics computers. As seen in FIG. 1, the 660 MLV 10 contains a backplane in which a plurality of custom cards 12a, 12b, 12c, 12d and 12e reside. Each of the custom cards 12a to 12e is custom for each one of the different types of avionics computer serviced by the MLV and is not programmable without removing the particular card from the MLV.

The custom cards 12a and 12b interface via lines 17a and 17b to the single ended driver/receiver avionics computers 14a and 14b through respective buffer boxes 16a and 16b. The custom cards 12c and 12d interface directly to a differential type driver/receiver avionics computers 14c and 14d via cables 15c and 15d.

Each buffer box 16a and 16b is unique for a particular application, for example, the buffer box 16a is unique to the F-16 EFCC avionics computer. Custom cards 18a and 18b reside in buffer boxes 16a and 16b, respectively. The custom cards 12a to 12e, 18a and 18b are specific to the requirements of their associated avionics computer 14a to 14e, as are the connecting cables 15c and 15d, 17a and 17b and 20a and 20b. The 1553 card 12e is unique to still another type of computer and is connected to such computer through cable 15e.

To load an operational flight program (OFP) into the 660 MLV, a so-called Raymond cassette is inserted into an internal Raymond tape driver 22. Once the OFP is loaded onto the MLV, the MLV is ready for down loading one of the avionics computers 14a to 14e. The 660 MLV is powered by an external power source 24. The buffer boxes 16a and 16b get power from the interface cables 17a and 17b, respectively.

Once the power of the MLV 10 has been turned on, the MLV boots up and a selected OFP file can be selected from the Raymond cassette, and the MLV can then load the selected file into a particular avionics computer 14 via one of the required custom cards 12a to 12e, and one of the cables 15c to 15e, 17a and 17b; 20a and 20b, and buffer box 16a or 16b.

The block diagram of FIGS. 2 and 3 show dedicated MLVs for particular Avionics Computers. In FIG. 2, the MLV 30 interfaces with a single-ended avionics computer 32 through a buffer box 34 in which a unique dedicated card 36 resides, and which requires unique cables 37 and 38. In FIG. 3 the avionics computer 40 interfaces directly with a differential avionics computer 42 via a unique cable 44. In both FIGS. 2 and 3, the systems are capable of loading only one type of Avionics computer.

DESCRIPTION OF A PREFERRED EMBODIMENT

Figure 4:
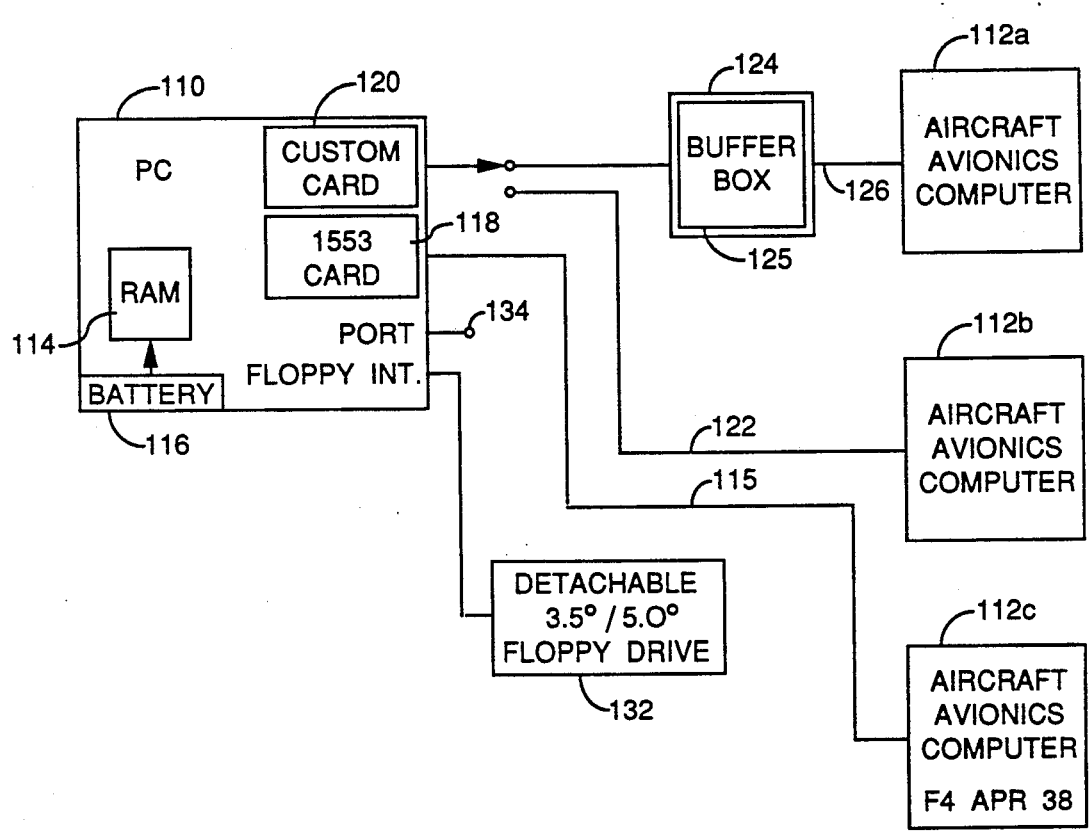
FIG. 4 of the drawing is a block diagram representation of the Universal Memory Loader Verifier in accordance with this invention.

Referring now to FIG. 4, the Universal Memory Loader Verifier (UMLV) provides a means for loading Operational Flight Programs (OFPs) into an unlimited number of avionics computers 112a, 112b and 112c. The avionics computers 112a represents all presently known single ended driver/receiver avionics computers. The avionics computers 112b represents all presently known differential driver/receiver avionics computers. The avionics computers 112c represents all presently known 1553 interface Avionics computers.

The UMLV system includes an arm held, personal computer (PC) 110, which is an off the shelf, tempest built, militarized AT compatible computer. The PC 110 includes a 4 MB static RAM 114, backed by a battery 116. Also, inside the PC 110 resides two additional cards 118 and 120. The card 118 is an off the shelf 1553 interface card used to load 1553 interface type Avionics computers 112c (such as the F-4 APR-38) via a cable 115. The card 120 is a custom card and is used to interface either directly to differential type driver/receiver avionics computer 112b via a cable 122, or to the avionics computers 112a through a buffer box 124 containing custom card 125, and custom cable 126. The cable 126 is customized for the particular type of avionics computer which is being loaded. The remaining elements of the system are universal for all presently known Avionics computers.

The custom cards 120 and 125 are similar in that they both contain electronic hardware that can be programmed with firmware by down loading the firmware from the PC 110. The firmware configures the custom card 120 and the buffer box card 125 to meet the timing requirements of the particular avionics computer to be loaded.

To load an OFP into the UMLV, an external floppy drive 132 is connected to the PC 110, or in the alternative, the OFP may be downloaded from some other source into the PC RS-232 port 134. In practice, no external power supply is used (but could be used) since the PC 110 has its own battery 116, thus making the system truly portable, and providing a permanent memory 114, into which the various OFPs are loaded. This is very important in a military environment since a hard disc within the PCs do not have the capability of meeting the environmental requirements that are imposed on such systems.

Once the PC power has been turned on the PC will boot up and the proper firmware configuration file for a particular avionics computer can be selected from the PC menu. Once the proper firmware configuration file is selected, the UMLV can load an OFP into a particular avionics computer.

It will be apparent to persons skilled in the art that this invention may be subject to various modifications and adaptations. It is intended, therefore, that the scope of the invention be limited only by the following claims as interpreted in the light of the prior art.

What is claimed is:

1. A universal memory loader verifier for loading and verifying operation flight programs into a number of different types of avionics computers, the combination comprising:

a personal computer having a random access memory;

a programmable card in said personal computer, said card being programmable for each of said number of different avionics computers;

a firmware file for each of said different types of avionics computers, said firmware file programming said programmable card for a particular avionics computer;

an operational flight program for each of said different avionics computers;

a detachable floppy disk drive for loading one of said firmware files onto said programmable card for programming said card to enable communications between said personal computer and one of said avionics computers; and means for loading said operational flight programs into said personal computer memory, said operational flight program being loaded onto said programmable card for transmission to said avionics computer.

2. The combination as defined in claim 1, and a buffer box having a custom card residing therein, said buffer box and said card being programmed for certain types of avionic computers;

and a custom cable for connecting the output of said buffer box to said certain types of avionic computers, the output from said personal computer being coupled, selectively, either directly to a selected avionics computer, or to another selected avionics computer through said buffer box.

3. The combination as defined in claim 1, and a battery maintaining said memory.

* * * * *